July 1, 1969 H. A. RAHMEL 3,453,641

AUDIENCE MEASURING SYSTEM

Filed May 10, 1967 Sheet 1 of 2

INVENTOR
HENRY A. RAHMEL
by
Mason, Kolehmainen, Rathburn and Wyss
ATTORNEYS.

INVENTOR
HENRY A. RAHMEL
by
Mason, Kolehmainen, Rathburn and Wyss
ATTORNEYS

United States Patent Office 3,453,641

Patented July 1, 1969

3,453,641

AUDIENCE MEASURING SYSTEM

Henry A. Rahmel, Evanston, Ill., assignor to A. C. Nielsen Company, Evanston, Ill., a corporation of Delaware Filed May 10, 1967, Ser. No. 637,414
Int. Cl. G01d *21/00*
U.S. Cl. 346—1 4 Claims

ABSTRACT OF THE DISCLOSURE

There is provided an improved system for compiling data concerning the channels to which a plurality of wave signal receivers are being operated. A time-channel record of each receiver is made at the receiver location on machine readable media such as magnetic tape. Periodically the magnetic tape is collected at a collection station where it is directed with any additional information into a computer suitably programmed to compile the desired information.

The present invention relates to an audience measuring system, and more particularly to a wave signal receiver monitoring and collecting system for compiling data concerning the channels to which the wave signal receiver is tuned. More particularly the present invention relates to an improved system for monitoring from a remote location, a plurality of remote receivers and for compiling the data thus received.

There are at present several systems which may be employed for determining audience preference as represented by channels to which the audience receivers are tuned. One of the earlier attempts to monitor home receivers utilized the so called "telephone call method" which involved the making of hundreds of personal telephone calls to randomly selected homes during the period when a particularly program of interest is in process and statistically analyzing the results of these telephone calls to determine the extent of listening. Another method, frequently used for surveying local areas, is the "diary-record" method wherein the audience of the receiver makes an entry in a diary, supplied for this purpose, recording the channels to which the receiver has been tuned. Where larger samples and larger areas are surveyed, the collection and recording of the channel representing data is done automatically by monitoring equipment. One monitoring system of this latter type is described in the patent granted to Rahmel, No. 2,833,859 granted May 6, 1958 wherein leased telephone lines are employed for continuously connecting each of a plurality of monitored receivers or homes to a central office in which a recorder or other tabulating equipment is located. This system of recording, of course, has the advantage of providing a substantially continuous reading of the receiver channels and has beeen used commercially where there is a large local market to be analyzed. One drawback with such a monitoring system is its comparatively high cost. Yet another automated system of analyzing audience preference employs the attachment of a signal attachment device to each monitored TV to produce an electrical signal which in turn provides a suitable indicia on a photographic film strips. The photographic film is replaced periodically, the exposed or used film being collected, processed and interpreted to provide useable data. Although such a photographic arrangement has been commercially used successfully for many years, certain difficulties are experienced in its use. More specifically, the photographic film, prior to its development, must be handled and processed in a suitable darkroom. Considerable human handling, checking and reading must be done at each stage of the processing of the data. Moreover in order to feed the data into a suitable computer, all of the data must be manually transcribed from the film strip to suitable machine readable media such as punch cards.

Advantageously it would be desirable to provide a new and improved method of collecting and analyzing audience preference data representing the channels to which a plurality of remote monitored receivers are being operated, which is inexpensive and which reliably provides a machine readable media so as to minimize the manual handling or interpretation of the data.

Accordingly it is an object of the present invention to provide a new and improved audience measuring system which overcomes the above mentioned difficulties.

Yet a further object of the present invention is to provide a new and improved audience measuring system which eliminates much of the hand processing required of many prior systems and which at the same time is economical to install and operate.

Yet a further object of the present invention is to provide an audience measuring system wherein the home calls required of a service representative are minimized.

Yet a further object of the present invention is the provision of a new and improved audience measuring system which utilizes magnetic tape as the recording medium.

Yet a further object of the present invention is the provision of an audience measuring system wherein machine readable media are provided at each of a plurality of remotely monitored receivers.

Further objects and advantages of the present invention will become apparent as the following description proceeds and the features of novely which characterize the invention will be pointed ont with particularity in the claims annexed to and forming a part of this specification.

In accordance with these and other objects, the new and improved audience measuring system, in accordance with the present invention, compiles data representing channels to which a plurality of remotely monitored receivers are each being operated. The improved method includes recording channel representing indicia on a first series of machine readable media each located at the respective individual receivers. In a preferred embodiment, the machine readable media are magnetic tapes. The channel representing indicia are recorded on the magnetic tape, and the magnetic tape is wound on a cartridge. Periodically the used tape cartridge is collected and an empty tape cartridge is placed on the magnetic tape recorder, the used magnetic tape and cartridge being mailed to a collection station. At the collection station additional information regarding, for example, data representing time and date reference characters, is recorded on additional machine readable media in proper sequence with the tapes, and the tapes are spliced together into a large reel. Thereafter the tapes and the last mentioned machine readable media, which in a preferred embodiment may be in the form of punch cards, are simultaneously directed into a computer suitably programmed to compile the information desired.

Advantageously it will be seen that the use of the magnetic recorder results in a substantial reduction of labor both in the field and the office. The reduction of labor in the field comes about in part by asking the housewife to perform some of the functions in collecting and mailing the tapes, by providing a recording meter that requires a minimum of maintenance, and by depending upon government mail service for delivery of the information to the processing office. The housewife is asked to perform the functions of cutting off the tape, removing the takeup cartridge or spool, recording on the mailing bag tag the end time of the tape (the time of cutting tape), putting on a new takeup cartridge, seeing that the tape engages the takeup cartridge, placing the used cartridge into the mailing bag and posting the mailing bag. This requires a little time and effort on the part of the housewife, but it has been found that by including a bonus, such as a one dollar bill, with the mailing of the empty cartridge, the housewives have been cooperative in returning the used tape and cartridge. Additionally the manual effort in handling and compiling the data after it has been received at the central station is minimized. The only usual manual effort is in the splicing together of the home tapes and recording the time and date reference data from the mailing bag tag onto machine readable media.

For a better understanding of the present invention, reference may be had to the accompanying drawing wherein.

Figure 1:
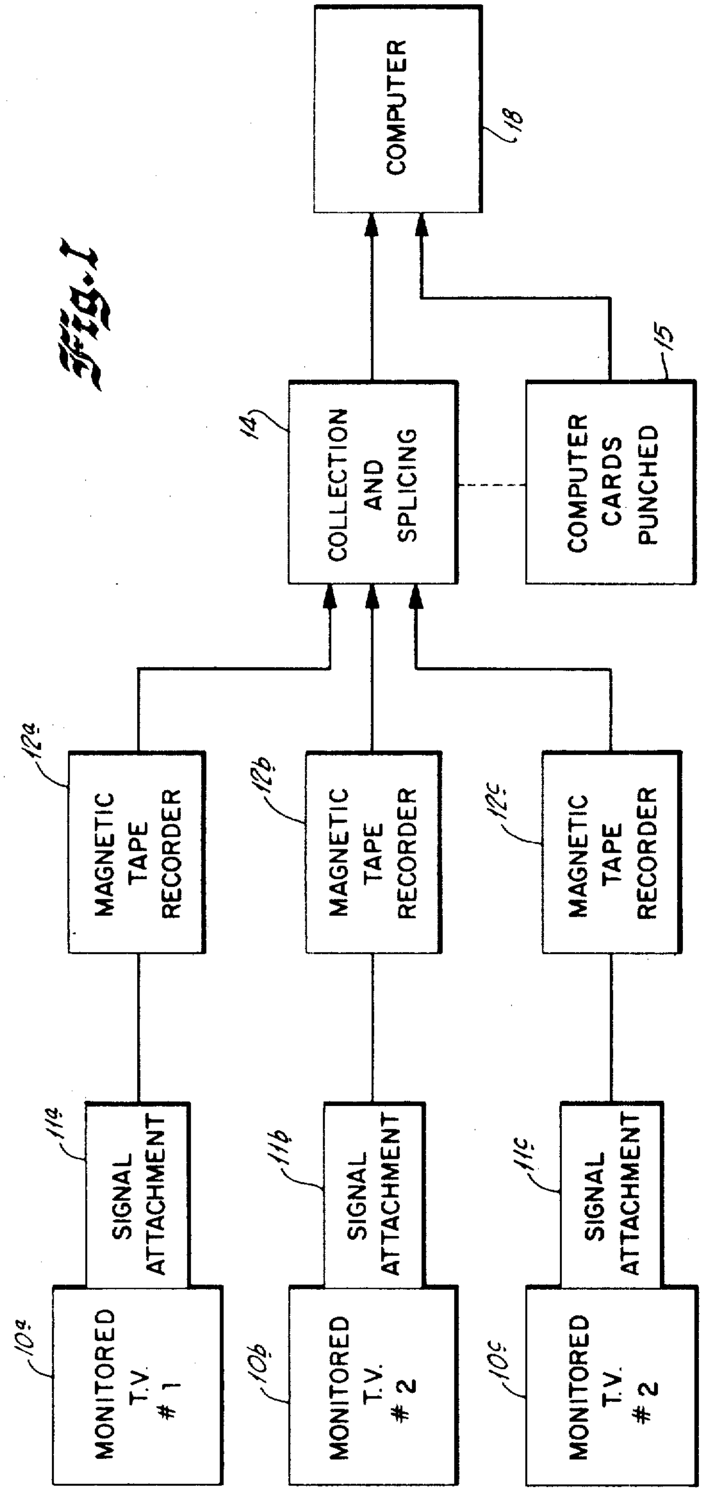
FIG. 1 is a block diagram illustrating the flow of data from the monitored televisions to the computer.

Referring now to the drawings, and particularly to FIG. 1, there is illustrated in block form the improved method of measuring audience preference in accordance with the present invention. More specifically, the data is to be collected from a plurality of remote monitored receivers, which may conventionally be television receivers individually represented as 10*a*, 10*b* and 10*c* and collectively referred to as 10. As is understood, the receivers 10*a*, 10*b* and 10*c* are remote from each other and remote from the collecting station. The receivers, 10*a*, 10*b* and 10*c* may be in the same geographic location, or may be in diverse geographical locations. The receivers 10 are each respectively connected to receiver or signal attachments, individually identified as 11*a*, 11*b* and 11*c*, and collectively referred to as 11. The signal attachments 11 produce electrical signals indicative of the operating condition of the associated receivers and may include a multi-contact switch as described in Patent No. 2,893,809, granted July 7, 1959 to H. A. Rahmel. The signal attachments 11 each individually transmit their electrical signals to suitable recorders for recording the channel representing data onto a first series of machine readable media. In the illustrated embodiment, the signals from each of the signal attachments 11 are fed into respective magnetic tape recorders 12*a*, 12*b* and 12*c* collectively referred to as 12. The magnetic tape recorders may be of the type described and claimed in copending application, Ser. No. 501,360, filed Oct. 22, 1965 by H. A. Rahmel and William L. Grube and assigned to the same assignee as the present invention, now Patent 3,387,797. The magnetic tape recorders 12 each provide a machine readable magnetic tape 13, FIGS. 2 and 4. When the magnetic tape 13 is removed from the magnetic tape recorder 12, a reference time, such as the date and time of removing the magnetic tape, is recorded. The tape is then forwarded, through the mail, to a collection station 14.

At the collection station 14 the individual magnetic tapes 13 are spliced together and at the same time additional data is recorded at a station 15 on a machine readable media such as computer punch cards representing date and time information. The spliced magnetic tapes 13, along with the punch cards, are then simultaneously fed into a computer 18 such as an IBM 1410 programmed to provide the desired compilations of information.

Figure 4:
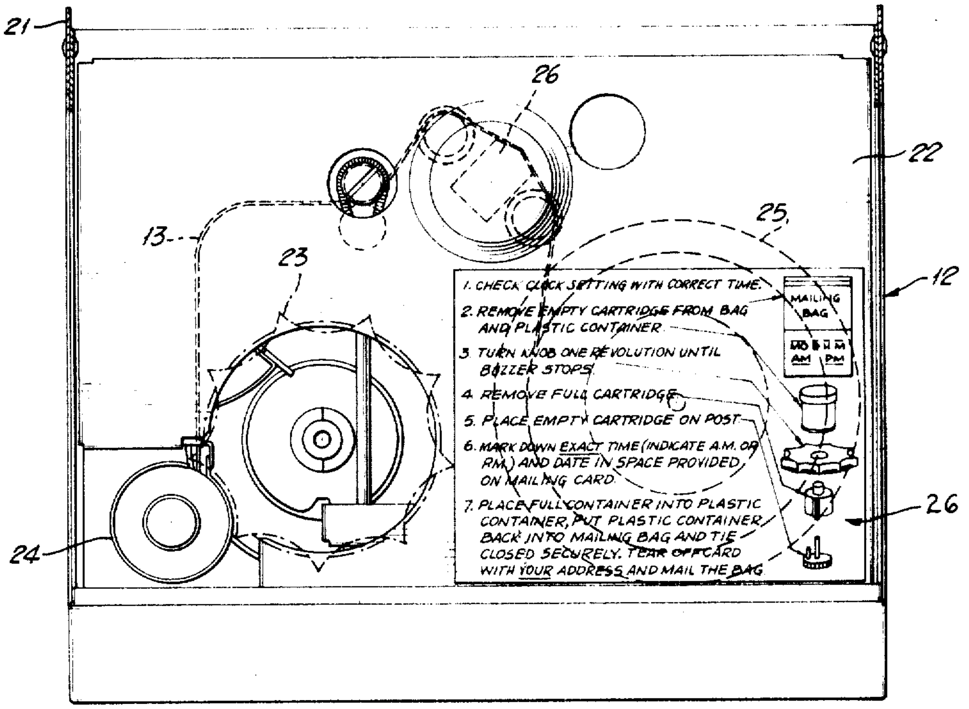
FIG. 4 is a plan view of the magnetic tape recorder of FIG. 3, shown with its cover removed, and including instructions to the housewife contained under the cover thereof.
Figure 3:
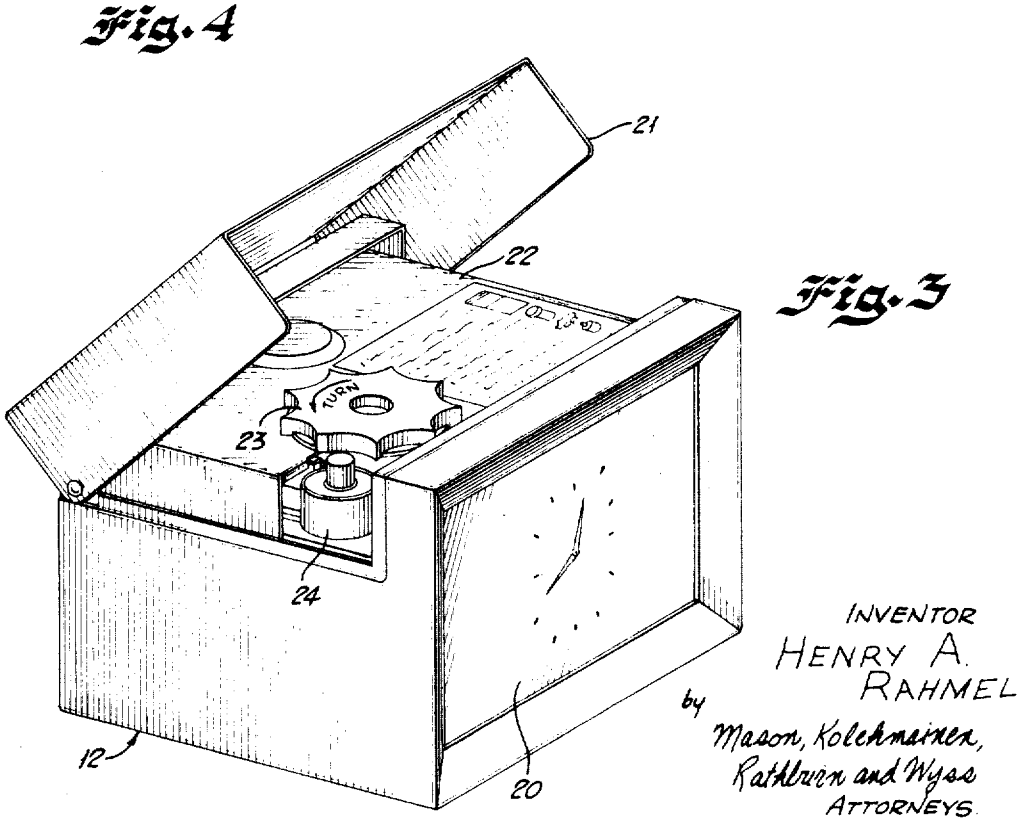
FIG. 3 is a perspective view of a magnetic tape recorder which may be utilized in the present systems.

In accordance with one aspect of the invention, a comparatively long supply of magnetic recording tape may be supplied by a serviceman, and the tape cut at the desired intervals of time. Referring, for example, to FIG. 4, there is illustrated a magnetic tape recorder of the type more fully described in the above mentioned Rahmel et al. application. The tape recorder may be provided, if desired, with an electric clock 20 such that the housewife or other operator will always have the correct time at the recorder at tape removal time. In addition the electric clock 20 makes the tape recorder attractive so that it may be set in view on the top of a home television set or the like. The recorder 20 has a hinged upper cover 21 which, when open, exposes an interior cover 22 enclosing the tape track of the tape recorder, except for a manually actionable tape cutoff knob 23 and a self positioning, self threading cartridge 24. The particular arrangement of the recorder 20 permits the housewife or other unskilled person to perform some of the functions previously required in the field which makes it possible to reduce the labor required to service the recorder 20. More specifically the housewife may perform the function of cutting off the tape by turning the tape cutoff knob 23, removing the takeup cartridge 24, recording on a mailing bag tag the end time of the tape (the time of cutting the tape) as indicated on the clock 33, along with the date, putting on a new takeup cartridge 24, then putting the removed takeup cartridge into a suitable container in a mailing bag and posting the mailing bag for forwarding to the collection station.

To supply the magnetic tape to the reel 24, there is a supply of tape on a tape reel 25 of approximately 450 feet or a normal 7½ month supply. Thus if a service call is scheduled every six months there will be an ample supply of tape to provide for periodic removals. The cartridges 24 for receiving the tape will have at least a capacity to hold 16 days of recording.

The tape from the reel 25 is passed over a suitable recording head 26 along a tape track which includes cutter mechanism actuated by the control knob 23. Moreover once the tape 13 has been severed by the housewife, and a new cartridge 24 installed on the spindle, the cartridge is designed to automatically take up the end of the new tape in a manner more fully described in the above mentioned Rahmel et al. application.

The design of the cartridge and mailing bag provides for ease, simplicity and economy of changing and mailing. As illustrated in FIG. 4, written instructions 26 to the home owner are glued inside the cover of the recorder 20 adjacent to the cutoff knob 23. As shown in the written instructions, the used cartridge 24 removed from the recorder 20 is inserted into a polyethylene tube with one end sealed and a cap over the open end. The tube containing the cartridge is then placed in a mailing bag, with the date and time being recorded on the mailing bag tag. More specifically when it is desired by the collecting station to provide a tape change, an empty cartridge 24 will be forwarded to the home in a suitable bag. When the bag is received by the housewife, the housewife removes the cartridge 24 from a plastic container, turns the cutoff knob 23 one full revolution, then removes the full cartridge 24 from the recorder 20, marking down the exact time and date in the space provided on the mailing card. The empty cartridge is placed on the cartridge post of the recorder while the full cartridge is returned into the plastic container, and the plastic container is replaced in the mailing bag and tied securely closed. One portion of the card is torn off with the home owner's address, thereby exposing the address of the collecting station. The bag is then posted in the mail for return to the collecting station.

Figure 2:
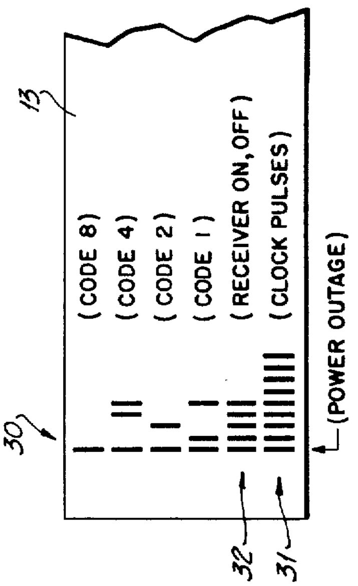
FIG. 2 is a fragmentary, somewhat schematic, representation of a section of magnetic tape containing channel representing indicia.

One problem which presents itself with the timed recording of data concerns power outages or failures which affect the time. Accordingly the recorder may be designed, if desired, with a suitable standby power unit to drive the timing device thereof during any power failures. In accordance with one embodiment of the invention, a crystal generator and standby battery power were provided to drive the timer and tape track for a 24-hour minimum standby. The crystal generator is employed to provide the time control upon which all the timing of the device depends. Timing, in the specific embodiment, does not depend upon power line supply frequency. Since the crystal generator of the timing device form the basis upon which all data from the home is computed, each time a service call is made to the home, either to repair the equipment or to replace the reel 25 of tape, the serviceman will provide a mark, hereinafter referred to as a power outage mark, PO, inserted in the tape as a check to assure accuracy. Such power outage mark may be designated by a full row of characters transversely across the tape, as indicated at 30, FIG. 2. Moreover the timing marks referred to are represented by a succession of indicia 31 longitudinally along the tape, as indicated in FIG. 2. At the same time the condition of the receiver (on, off) may be also indicated by suitable indicia longitudinally of the tape as indicated at 32, FIG. 2. The remaining longitudinal channels on the tape 2 represent channel identifying data in binary code.

In order to provide the time information to the computer 18, the time information is punched on suitable punch cards at the time of splicing the reels together. More specifically when the reels are received at the collecting station, all the tapes from one market will be spliced together on one reel. As they are spliced suitable indicia are punched on the tape to provide numerical identification of the reel with the home, such as the last digits of the home number. As the operator splices the home tapes onto the larger reel, she will also note the home number, date and clock time of supply spool change onto a suitable sheet, and any faults that she might discern such as crumbled tape, no tape and the like on a chart. The information from the chart that the operator has prepared will be punched onto punch cards in the same sequence as the tapes on the reel. From this point the reels with their associated stack of cards will go through the IBM 1410 computer and 905 tape transporter or like tape transporter.

Thus the computer has at least two time reference points fed into it by the punched cards. The end time or time of removal of the tape, as recorded on the mailing card, is fed to the computer on the punch card. In addition the start time, taken from the last run or from the fieldman's time mark when the tape was changed will also be recorded. Moreover a PO (power outage) recorded by the fieldman at any time that he services the device will also be recorded.

Advantageously in comparing the cost of the magnetic tape interrogating system according to the present invention with the present commercial system of photographic film, it is estimated that the recording medium for the magnetic tape audiometer will run approximately $1.20 per year as compared to $6.84 for the photographic film for a like period. However, a more significant saving may be that the supply cartridge including the tape, boxed and placed in a mailing bag with an addressed card and suitable monies for the housewife's efforts, weighs less than ⅞ of an ounce and as a result can be mailed to and from the corroborator's home for a total of 10 cents postage each trip. This compares with 70 cents each round trip for the photographic film magazine. Moreover, the mailing of each takes place 12 to 24 times a year.

If desired the present system can be readily adapted to multi-set homes and to portable television receivers when the volume of such units justifies the monitoring thereof.

What is claimed as new and desired to be secured by Letters Patent of the United States is:

1. An audience measuring method for recording data representing channels to which a plurality of remote monitored receivers are each tuned, said method comprising recording channel representing indicia and periodic timing marks on a series of machine readable media each located at a respective individual receiver, collecting said media at a common location, recording the time of occurrence of a selected timing mark on each machine readable media within the series on a separate time information machine readable media, and directing both said series of machine readable media and said time information machine readable media into a computer.

2. An audience measuring method for recording data representing channels to which a plurality of remote monitored receivers are each tuned, said method comprising recording channel representing indicia and periodic timing marks on a series of machine readable tapes each located at a respective individual receiver, collecting said tapes at a common location, recording the time of occurrence of a selected timing mark on each tape on machine readable media, and directing both said tapes and said media into a computer.

3. An audience measuring method as set forth in claim 2 and additionally including the step of splicing said tapes together onto a larger reel prior to their direction into a computer.

4. An audience measuring method as set forth in claim 2 wherein the last mentioned recording step comprises punching the times of occurrence onto machine readable punch cards.

References Cited

UNITED STATES PATENTS

| | | | |
|---|---|---|---|
| 2,660,507 | 11/1953 | Cordell | 346—22 |
| 3,126,513 | 3/1964 | Kamen | 346—37 X |
| 3,142,043 | 7/1964 | Schrimpf | 340—172.5 |
| 3,200,380 | 8/1965 | MacDonald | 340—172.5 |

RICHARD B. WILKINSON, *Primary Examiner.*

JOSEPH W. HARTARY, *Assistant Examiner.*

U.S. Cl. X.R.

346—37; 340—172.5